Feb. 26, 1952     J. D. SIMMONS ET AL     2,586,872
WATERER AND FEEDER DEVICE
Filed Oct. 21, 1946
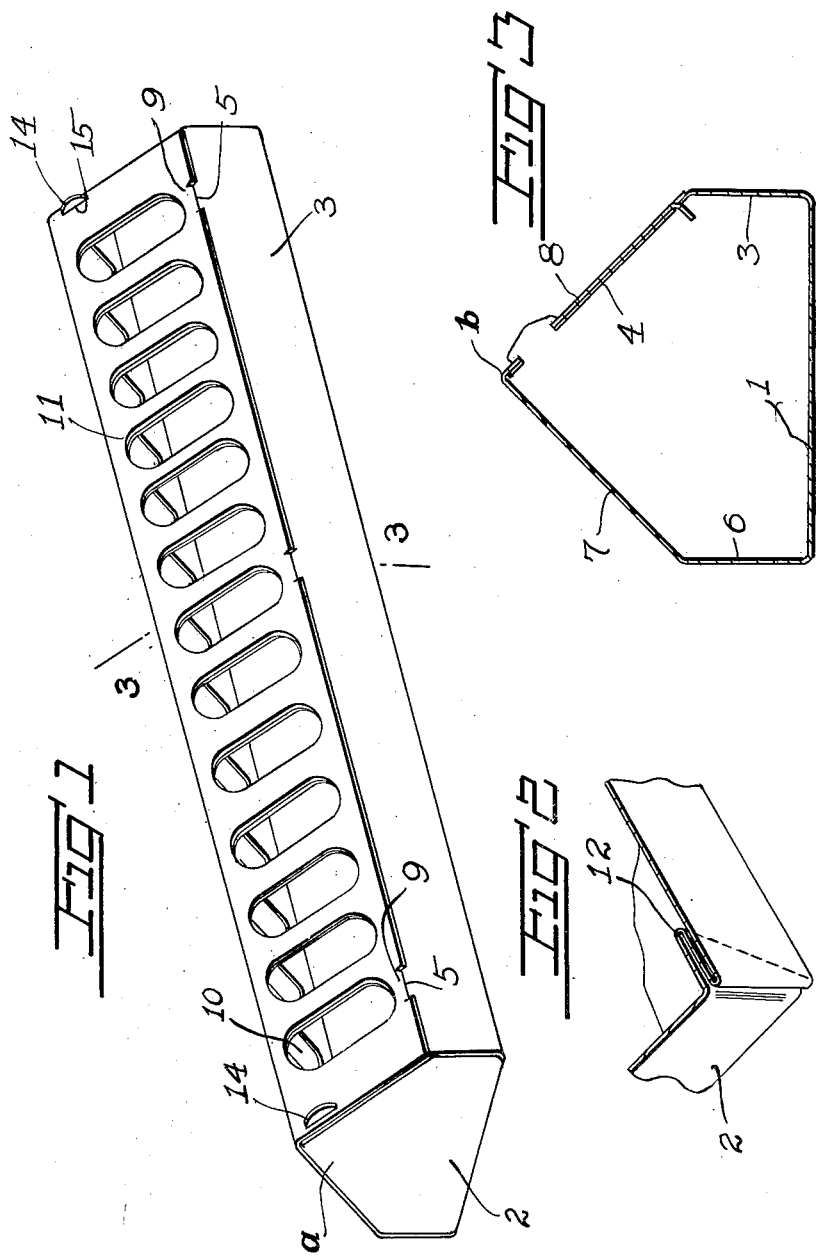
INVENTOR.
Jesse D. Simmons
Leon K. Simmons
BY
Attorney Patented Feb. 26, 1952

2,586,872

UNITED STATES PATENT OFFICE 2,586,872

WATERER AND FEEDER DEVICE

Jesse D. Simmons and Leon K. Simmons,
Wichita, Kans.

Application October 21, 1946, Serial No. 704,562

1 Claim. (Cl. 119—61)

This invention relates to a poultry feeder and waterer of a type especially designed for use in connection with chickens and it is primarily an object of the invention to provide a device of this kind made of fiberboard, preferably well-known pasteboard.

It is also an object of the invention to provide a device of this kind made of a fiberboard folded in a manner whereby the several parts are effectively maintained in applied or assembled relation and which is of a character to effectively protect the contents of the device from the elements and particularly rain and moisture.

The invention consists in the details of construction and in the combination and arrangement of the several parts of our improved poultry feeder and waterer whereby certain advantages are attained, as will be hereinafter more fully set forth.

In order that our invention may be better understood, we will now proceed to describe the same with reference to the accompanying drawing, wherein:

Figure 1 is a view in perspective of a feeder and waterer constructed in accordance with an embodiment of our invention;

Figure 2 is a fragmentary view in perspective taken at one corner of the body of the device; and Figure 3 is a sectional view taken substantially on the line 3—3 of Figure 1.

As illustrated in the accompanying drawing, the device comprises a structure which is produced from one sheet or blank of material such as pasteboard or other preferred fiberboard and which sheet or board is treated with paraffin or otherwise as may be preferred to make the same watertight.

The blank is of required dimensions and comprises a bottom wall 1 having each end continued by an end wall flap 2 of required configuration and preferably having its outer or upper portion $a$ in the form of an inverted V although this configuration may be changed as desired. One longitudinal marginal portion of the wall 1 is defined by an upstanding front side wall 3 of desired height and having its upper marginal portion continued therealong with a top wall section 4 adapted to be disposed inwardly and upwardly on a predetermined angle as clearly illustrated in the accompanying drawing.

This wall 4 adjacent to its junction with the side wall 3 is provided at spaced points therealong with slits 5 herein disclosed as three in number, one being at substantially the longitudinal center of the wall 4 while the others are adjacent the extremities thereof. The opposite longitudinal margin of the bottom wall 1 is defined by a second or rear side wall 6 extending therealong and which is continued by a second top wall section 7 also adapted to be disposed upwardly and inwardly at a desired angle. The outer longitudinal margin of this wall 7 is continued therealong by a supplemental top wall 8 which, in the assembly of the device, overlies the wall 4 with the upper or free longitudinal margin of the wall 4 closely adjacent to the junction line $b$ between the walls 7 and 8.

The wall 8 is of an area substantially equal to that of the wall 4 and at spaced points therealong the free longitudinal margin of the portion of the wall 8 has struck out therefrom the tongues 9 which are inserted from above through the slits 5 whereby the body of the device is maintained in assembled relation. The wall 7 at spaced points therealong is provided with the elongated openings 10 disposed transversely thereof and through which poultry have ready access to the contents of the device.

The superimposed walls 4 and 8 are provided with openings 11 similar to the openings 10 just referred to and which, of course, have the same purpose.

Each of the end wall flaps 2 is disposed vertically with respect to the bottom wall 1 to close the adjacent end of the device and as is particularly illustrated in Figure 2, each lower side of the marginal portion of the wall 2 is provided with an inwardly disposed fold 12 whereby additional strength is given to the device as a whole.

Each of the end walls 2 adjacent to the apex of the portion $a$ has extended outwardly from one margin thereof a tongue 14 insertable through registering slits 15 formed through the walls 4 and 8, whereby the end wall 2 is maintained in effective or working position and to further maintain the walls 4 and 8 in assembly.

It is to be stated that the device as herein embodied is of special advantage for use in connection with baby chickens and that it is of a character to be economically produced, yet possessing sufficient strength and affording maximum of service.

From the foregoing description it is thought to be obvious that a poultry feeder and waterer constructed in accordance with our invention is particularly well adapted for use by reason of the convenience and facility with which it may be assembled and operated.

We claim:

A poultry feeder formed of a single piece of material and comprising a bottom, end walls extending upwardly therefrom and each formed with two converging top edges, side walls joined to the bottom and end walls and upwardly converging top walls each forming a continuation of a side wall, said top walls resting at their ends upon the top edges of the end walls, one of said top walls having an extended portion overlying the top of the other top wall, the said one top wall having feeding openings therein, the said other top wall and the overlying portion having coinciding feeding openings therein, means coupling the said other top wall and the overlying portion to the end walls, and means locking the said other top wall and the overlying portion together comprising integral tongues carried by the said overlying portion and slots formed in the underlying top wall in which said tongues are engaged.

JESSE D. SIMMONS.
LEON K. SIMMONS.

REFERENCES CITED

The following references are of record in the file of this patent:

UNITED STATES PATENTS

| Number | Name | Date |
| --- | --- | --- |
| 1,311,047 | Cole | July 22, 1919 |
| 1,690,178 | Reeves | Nov. 6, 1928 |
| 1,715,583 | Warren | June 4, 1929 |
| 1,861,206 | Burgess | May 31, 1932 |
| 1,950,104 | Ewers | Mar. 6, 1934 |
| 2,118,322 | Mohler | May 24, 1938 |
| 2,354,751 | Hartman | Aug. 1, 1944 |